United States Patent
Liao et al.

(10) Patent No.: US 12,120,214 B2
(45) Date of Patent: Oct. 15, 2024

(54) ENCRYPTION DETERMINING DEVICE AND METHOD THEREOF

(71) Applicant: INSTITUTE FOR INFORMATION INDUSTRY, Taipei (TW)

(72) Inventors: Jian-Wei Liao, Taipei (TW); Cheng-En Lee, Taipei (TW); Ting-Yu Lin, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 220 days.

(21) Appl. No.: 17/977,320

(22) Filed: Oct. 31, 2022

(65) Prior Publication Data
US 2024/0113856 A1    Apr. 4, 2024

(30) Foreign Application Priority Data
Oct. 4, 2022 (TW) .................................. 111137746

(51) Int. Cl.
| | |
|---|---|
| H04L 9/00 | (2022.01) |
| G06F 21/55 | (2013.01) |
| G06F 21/56 | (2013.01) |
| G06F 21/57 | (2013.01) |

(52) U.S. Cl.
CPC ............ *H04L 9/002* (2013.01); *G06F 21/556* (2013.01); *G06F 21/566* (2013.01); *G06F 21/577* (2013.01)

(58) Field of Classification Search
CPC ..... H04L 9/002; G06F 21/566; G06F 21/577; G06F 21/556
See application file for complete search history.

(56) References Cited

U.S. PATENT DOCUMENTS

| 2016/0127124 A1* | 5/2016 | Prvulovic | ............... H04L 9/003 380/28 |
| 2018/0084581 A1* | 3/2018 | Terry | ...................... H04L 5/006 |
| 2021/0365554 A1* | 11/2021 | Sakalis | ................ G06F 21/554 |

FOREIGN PATENT DOCUMENTS

| CN | 107798237 A | * | 3/2018 | .......... G06F 21/556 |
| CN | 111832025 A | | 10/2020 | |
| CN | 112883385 A | | 6/2021 | |

* cited by examiner

*Primary Examiner* — Richard G Keehn
(74) *Attorney, Agent, or Firm* — Birch, Stewart, Kolasch & Birch, LLP

(57) ABSTRACT

The present invention provides an encryption determining method. The method includes the following steps: receiving a side channel signal; generating a filtered side channel signal by filtering noise within the side channel signal; generating a phasor signal by utilizing a filter to covert the filtered side channel signal; locating the encrypted segment by calculating a periodicity of the phasor signal utilizing a standard deviation window; extracting at least one encrypted characteristic from the encrypted segment; and generating an encryption analytic result by recognizing the at least one encrypted characteristic according to a characteristic recognition model; wherein the encryption analytic result includes a position of the encrypted segment within the side channel signal, and an encryption type corresponding to the side channel signal. The present invention is able to automatically and efficiently locate the encryption segment and analyze the encryption type corresponding to the side channel signal.

18 Claims, 18 Drawing Sheets

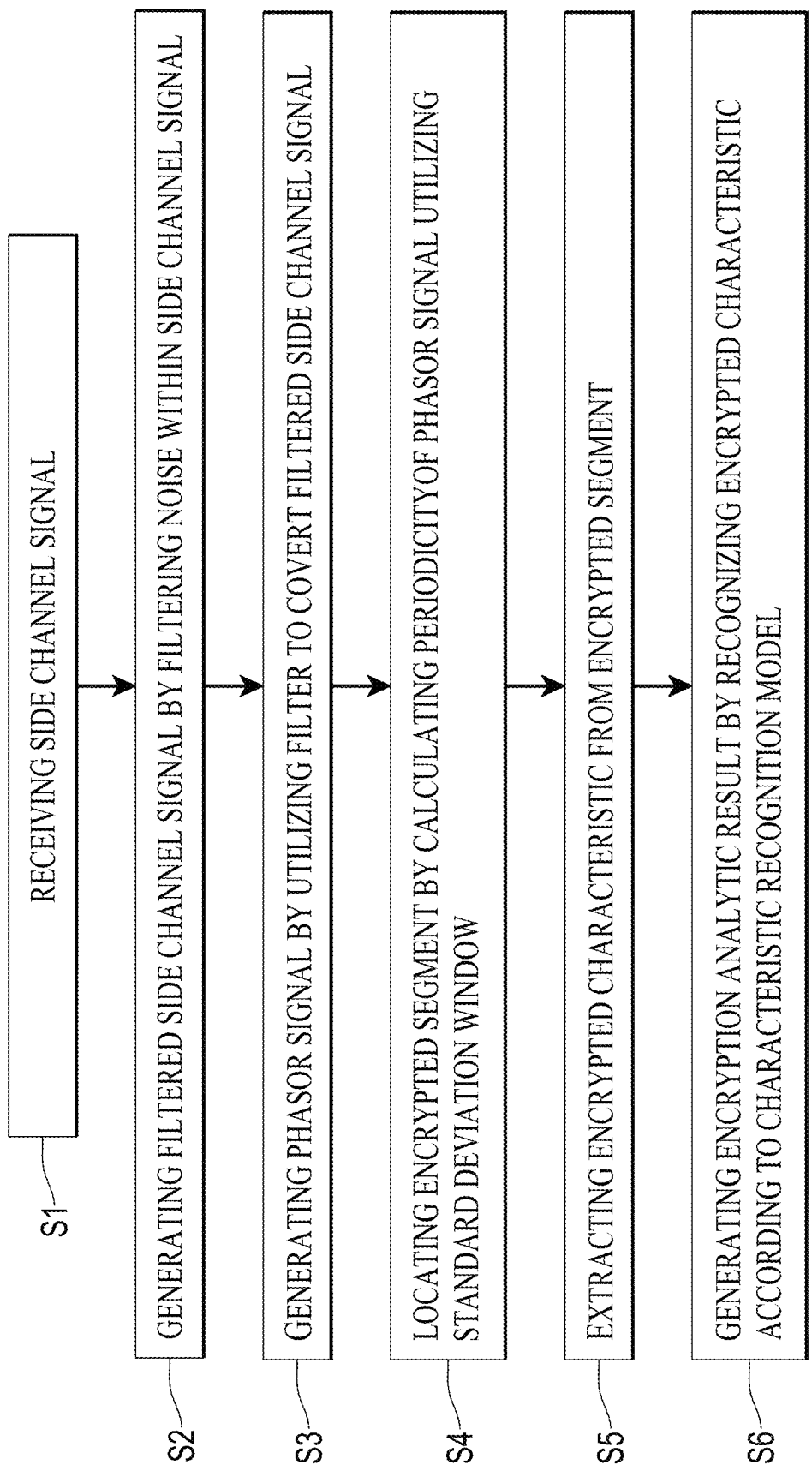

ENCRYPTION DETERMINING DEVICE AND METHOD THEREOF

CROSS-REFERENCE TO RELATED APPLICATION(S)

This application claims the priority benefit of TW application serial No. 111137746 filed on Oct. 4, 2022, the entirety of which is hereby incorporated by reference herein and made a part of the specification.

BACKGROUND OF THE INVENTION

1. Field of the Invention

The present invention relates to an encryption determining device and method thereof, more particularly an encryption determining device and method thereof for gathered side channel information.

2. Description of the Related Art

As security measures improve, more and more circuits are able to encrypt data according to new circuit designs. When these circuits incorporate modern encryption algorithms for combining both hardware and software protections, these circuits become nearly impossible to be cracked.

In this light, performing side channel attacks (SCAs) on post-silicon chips has recently become internationally famed as a new cracking method. An SCA utilizes collected physical signals inadvertently emanated from a hardware device when the hardware device is encrypting data, and through performing statistical analysis and processing signals, the SCA is able to analyze the collected physical signals to obtain encrypted secret messages such as a decryption key or a plaintext before the encryption. These physical signals inadvertently emanated from the hardware device may be measured as, for example, electromagnetic waves, currents, power, audible decibels, detectable light signals of a signal light of a processing device, etc. These different kinds of physical signals may all be collected by various types of SCA collector devices. A physical signal collected by an SCA collector device is also called a trace.

Currently, collecting and measuring devices of side channel information have already been developed, and therefore a collection of side channel information may be done with relative ease. However, to analyze the collected side channel information still requires great effort. For example, in order to crack an encryption key from the side channel information, currently such method still requires a time-consuming statistical analysis towards the side channel information. Since the side channel information may include loud white noises or other unrelated signals generated during the encryption process, to analyze the side channel information not only requires a large amount of time, but also requires human effort of experienced professionals to decipher the side channel information and to locate encrypted segments of information from the side channel information.

SUMMARY OF THE INVENTION

The present invention provides an encryption determining device and a method thereof. The present invention is able to detect a side channel signal, to efficiently locate a position of an encrypted segment within the side channel signal, and to analyze an encryption type utilized for the encrypted segment.

The encryption determining device includes a side channel sensor, a memory, and a processor. The processor is electrically connected to the side channel sensor and the memory. The side channel sensor detects the side channel signal. The memory stores a characteristic recognition model. The processor is configured to receive the side channel signal from the side channel sensor, generate a filtered side channel signal by filtering noise within the side channel signal, generate a phasor signal by utilizing a filter to covert the filtered side channel signal, locate an encrypted segment by calculating a periodicity of the phasor signal utilizing a standard deviation window, extract at least one encrypted characteristic from the encrypted segment, and generate an encryption analytic result by recognizing the at least one encrypted characteristic according to the characteristic recognition model; wherein the encryption analytic result includes a position of the encrypted segment within the side channel signal, and an encryption type corresponding to the side channel signal.

The encryption determining method of the present invention is executed by the processor, and the encryption determining method of the present invention includes the following steps: receiving the side channel signal from the side channel sensor; generating a filtered side channel signal by filtering noise within the side channel signal; generating a phasor signal by utilizing a filter to covert the filtered side channel signal; locating the encrypted segment by calculating a periodicity of the phasor signal utilizing a standard deviation window; extracting at least one encrypted characteristic from the encrypted segment; and generating an encryption analytic result by recognizing the at least one encrypted characteristic according to the characteristic recognition model; wherein the encryption analytic result includes the position of the encrypted segment within the side channel signal, and the encryption type corresponding to the side channel signal.

After the side channel sensor receives the side channel signal from a circuit, the side channel sensor sends the side channel signal to the processor, allowing the processor to execute the encryption determining method. The encryption determining method filters noise within the side channel signal with the processor, transforms the filtered side channel signal into the phasor signal, and utilizes the standard deviation window to calculate the periodicity of the phasor signal for further locating the encrypted segment. In comparison to prior arts, the present invention is able to locate the encrypted segment without human assistance, and thus the present invention is able to automatically locate the encrypted segment according to the side channel signal received. Furthermore, the present invention is able to extract the at least one encrypted characteristic from the encrypted segment. This further allows the generation of the encryption analytic result by recognizing the at least one encrypted characteristic according to the characteristic recognition model stored in the memory, and thus analyzing the encryption type corresponding to the side channel signal.

Overall, the present invention not only functions automatically, but also is able to more efficiently locate the encrypted segment. For this reason, the present invention is able to decrease time needed for analyzing the encryption type corresponding to the side channel signal, and thus more efficiently analyze the encryption type corresponding to the side channel signal.

BRIEF DESCRIPTION OF THE DRAWINGS

FIG. 3 is a flow chart of an encryption determining method of the present invention.

DETAILED DESCRIPTION OF THE INVENTION

The present invention provides an encryption determining device and an encryption determining method.

Figure 1:
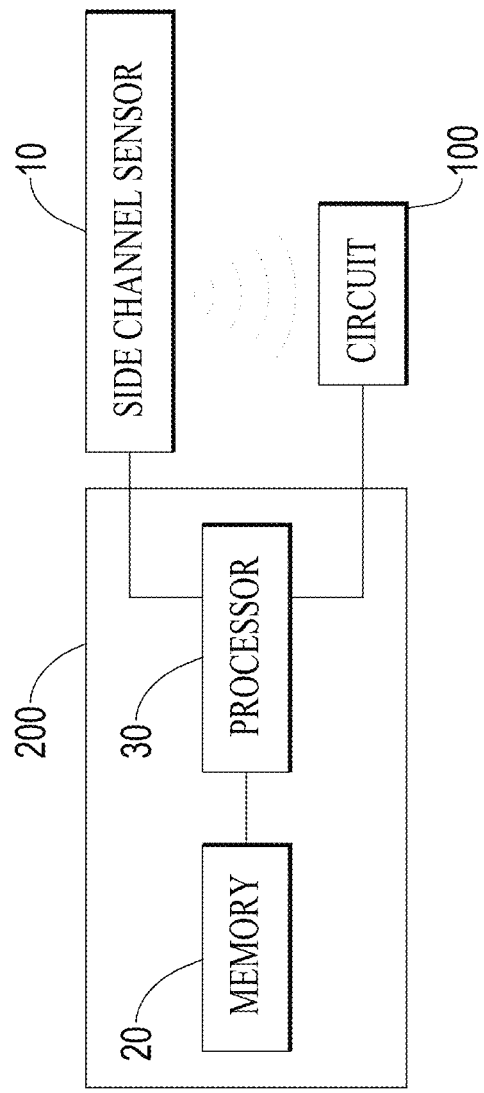
FIG. 1 is a block diagram of an encryption determining device of the present invention.

With reference to FIG. 1, the encryption determining device of the present invention includes a side channel sensor 10, a memory 20, and a processor 30. The encryption determining device is utilized to sense and identify a side channel signal gathered from a circuit 100. The processor 30 is electrically connected to the side channel sensor 10 and the memory 20. The circuit 100 is controlled by an electronic device 200 for executing actions such as, for example, encrypting data.

Figure 2:
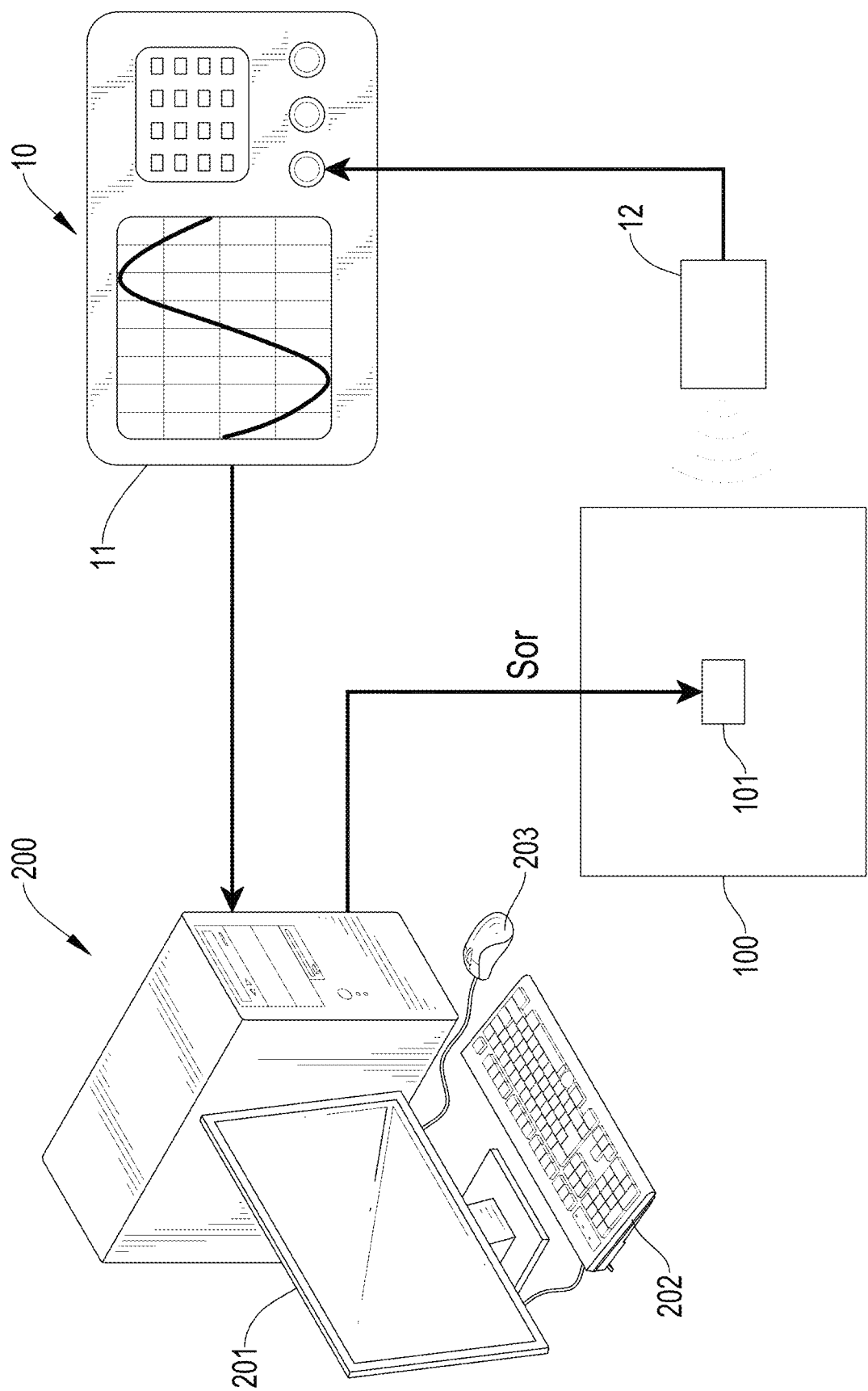
FIG. 2 is a perspective view of the encryption determining device of the present invention.

With further reference to FIG. 2, for example, the memory 20 and the processor 30 may be a memory and a processor within the electronic device 200, or the memory 20 and the processor 30 may be electronic components independent from the electronic device 200. The electronic device 200 further includes a monitor 201, a keyboard 202, and a mouse 203. A user of the present invention is able to control the electronic device 200 via the monitor 201, the keyboard 202, and the mouse 203 of the electronic device 200. The circuit 100 includes a communication port 101, and the communication port 101 is electrically connected to the processor 30 of the electronic device 200. As such, the communication port 101 functions, as its name suggests, a communication port between the circuit 100 and the processor 30. In this example, the processor 30 sends an original signal (Sor) to the communication port 101 of the circuit 100, wherein the original signal (Sor) includes a plaintext within. After the circuit receives the original signal (Sor) from the processor 30 through the communication port 101, the circuit 100 starts encrypting the plaintext within the original signal (Sor).

The side channel sensor 10 includes an oscilloscope 11 and a detector 12. The oscilloscope 11 is electrically connected to the electronic device 200, and the detector 12 is electrically connected to the oscilloscope 11. The detector 12 of the side channel sensor 10 detects a trace generated by the circuit 100 when the circuit is encrypting the plaintext. As such, the detector 12 collects the side channel signal from the circuit 100, and the detector 12 transports the side channel signal to the oscilloscope 11. The oscilloscope 11 is able to display a waveform of the side channel signal, allowing the user to track changes of the waveform of the side channel signal through manipulating the oscilloscope 11. This way, the waveform of the side channel signal is tracked and made to be clearly defined through manipulations of the oscilloscope 11.

In the present embodiment, the detector 12 is a voltage-conducting wire, and the voltage-conducting wire is electrically connected to a point on the circuit 100 that generates the side channel signal. This allows for a collection of voltage signals generated by the circuit 100 when the circuit 100 is encrypting the plaintext, and the voltage signals collected are utilized as the side channel signal. For example, the point on the circuit 100 that generates the side channel signal could be the communication port 101, or any other nodes available for collecting the side channel signal. In another embodiment, the detector 12 may be a current-conducting wire, and the current-conducting wire is utilized to collect current signals generated by the circuit 100 when the circuit 100 is encrypting the plaintext. The detector 12 also may be an infra-red temperature sensor, wherein the infra-red temperature sensor is utilized to collect infra-red temperature signals in close proximity generated by the circuit 100 when the circuit 100 is encrypting the plaintext. The detector 12 also may be an electro-magnetic wave sensor, wherein the electro-magnetic wave sensor is utilized to collect electro-magnetic signals emanated from the circuit 100 in close proximity when the circuit 100 is encrypting the plaintext. In other words, the present invention is free to collect any physical forms of signals as the side channel signal. For instance, the side channel signal may be a voltage signal, a current signal, a temperature signal, or an electro-magnetic signal, etc.

The memory 20 stores a characteristic recognition model, a working frequency, a default configuration file, and a weight data. The characteristic recognition model is a trained artificial intelligence (AI) model. When the present invention proceeds to further train the characteristic recognition model, the processor 30 utilizes a result generated by the present invention as well as the weight data to train the characteristic recognition model. The weight data is a score entered by the user into the electronic device 200, the score rating the result generated by the present invention. In other words, the weight data helps train the characteristic recognition model to more accurately help generate the result for the present invention. The working frequency is a frequency of the circuit 100 when the circuit 100 is working normally. The default configuration file stores parameters utilized by the present invention when the present invention is calculating and analyzing data.

With reference to FIG. 3, after the side channel sensor 10 gathers the side channel signal from the circuit 100, the side channel sensor 10 sends the side channel signal to the processor 30. The processor 30 of the present invention executes the following steps:

Step S1: receiving the side channel signal from the side channel sensor 10.

Step S2: generating a filtered side channel signal by filtering noise within the side channel signal.

Step S3: generating a phasor signal by utilizing a filter to covert the filtered side channel signal.

Step S4: locating the encrypted segment by calculating a periodicity of the phasor signal utilizing a standard deviation window.

Step S5: extracting at least one encrypted characteristic from the encrypted segment.

Step S6: generating an encryption analytic result by recognizing the at least one encrypted characteristic according to the characteristic recognition model. The encryption analytic result includes a position of the encrypted segment within the side channel signal, and an encryption type corresponding to the side channel signal.

The following descriptions will expand upon the aforementioned steps S1 to S6 executed by the processor 30.

In step S1, the processor 30 receives the side channel signal detected by the side channel sensor 10. As mentioned, the side channel signal may be a voltage signal, a current signal, a temperature signal, or an electro-magnetic signal, etc.

In step S2, the processor 30 filters noise within the side channel signal and generates the filtered side channel signal. More particularly, the processor 30 utilizes spectral filtering to filter out frequencies within the side channel signal greater than or less than the working frequency as noises to generate the filtered side channel signal. In other words, the filtered side channel signal generated by the processor 30 is only in the working frequency.

Figure 4A:
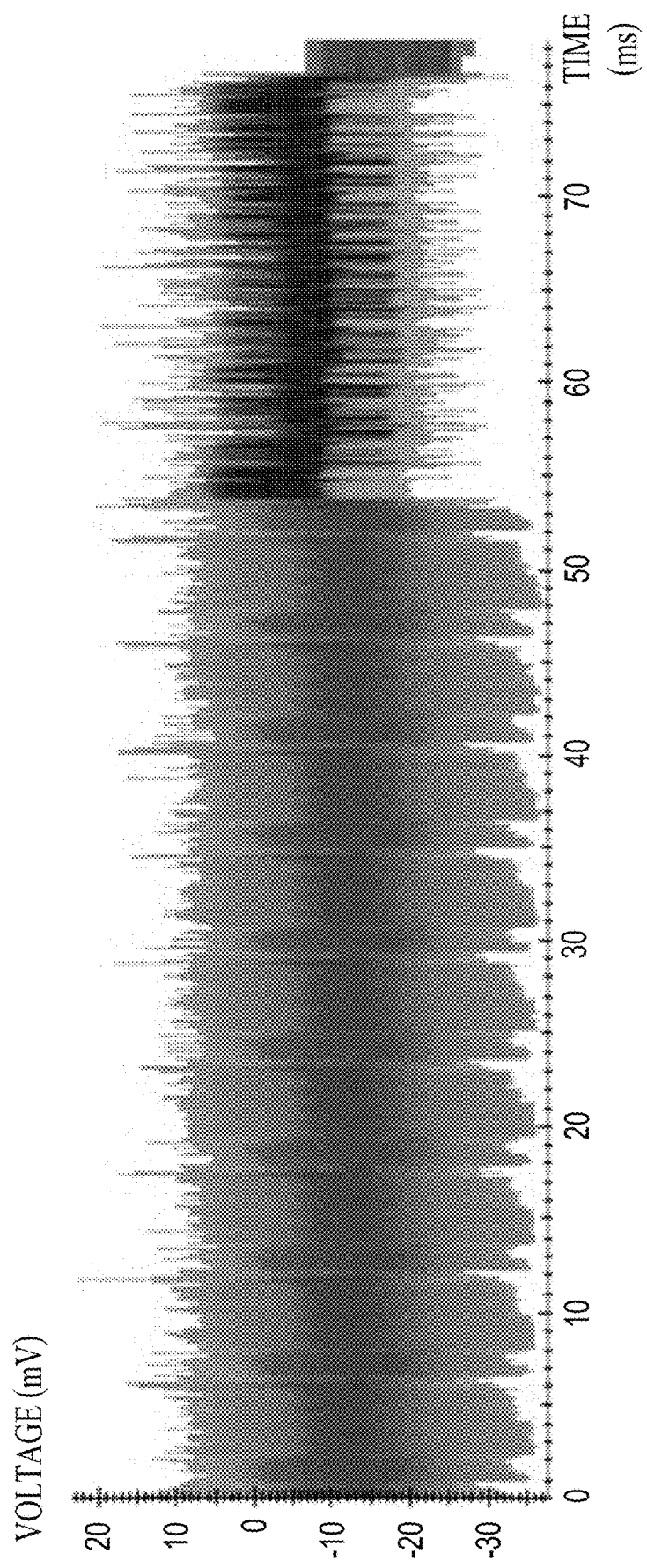
FIG. 4A is a perspective view of a side channel signal.
Figure 4B:
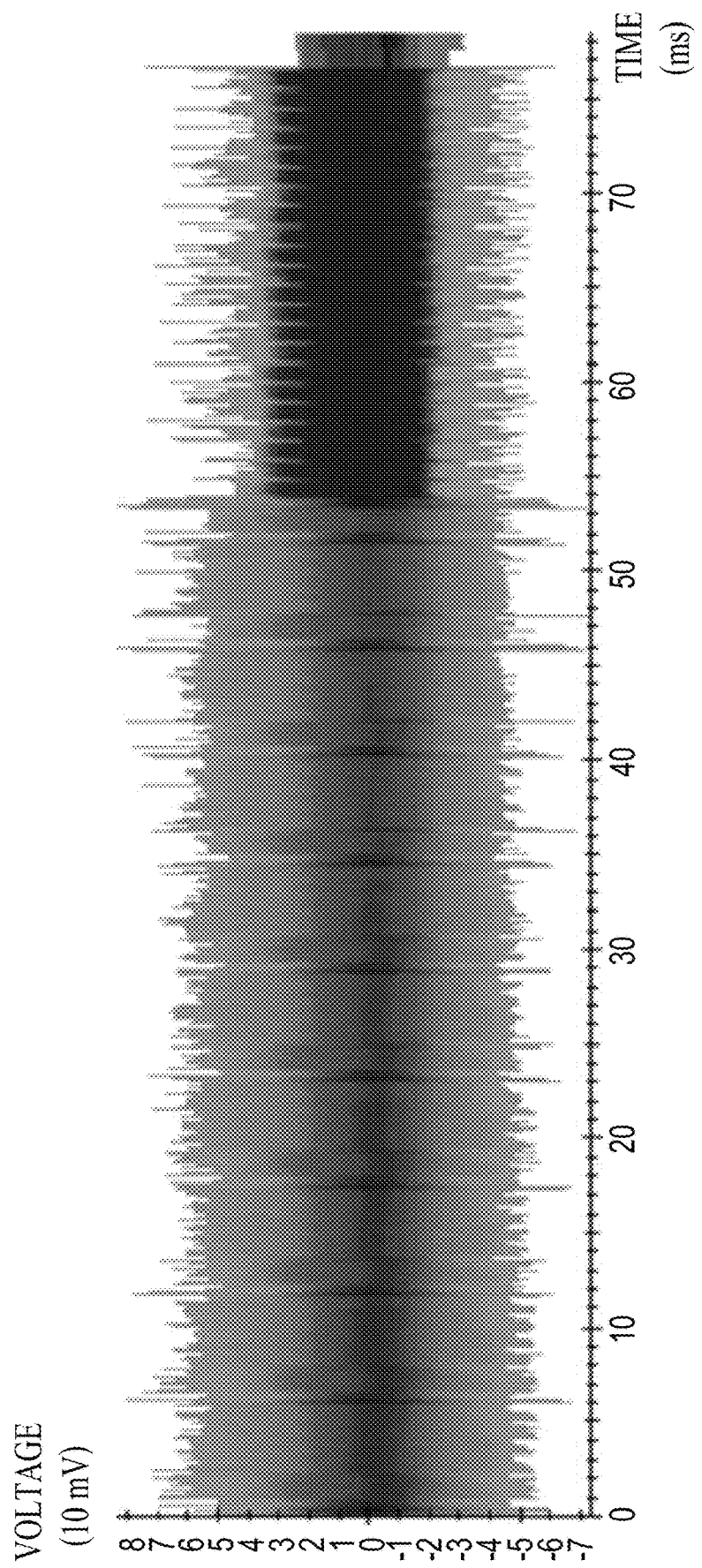
FIG. 4B is a perspective view of a filtered side channel signal.

With reference to FIGS. 4A and 4B, FIG. 4A shows waveform of the side channel signal before filtering, and FIG. 4B shows waveform of the filtered side channel signal. For FIGS. 4A and 4B, the vertical axis (Y axis) is in units of 10 fold millivolts (mV), and the horizontal axis (X axis) is in units of milliseconds (ms). In FIG. 4A, the waveform of the side channel signal before filtering has larger amplitude, and has more irregular patterns, for example, between 55 ms and 75 ms. In FIG. 4B, the waveform of the filtered side channel signal has smaller amplitude, and has less irregular patterns between 55 ms and 75 ms. As such, the waveform of the filtered side channel signal is more defined, and therefore the filtered side channel signal is more suitably utilized for locating the encrypted segment and for analyzing the encryption type than the side channel signal before filtering.

Figure 5:
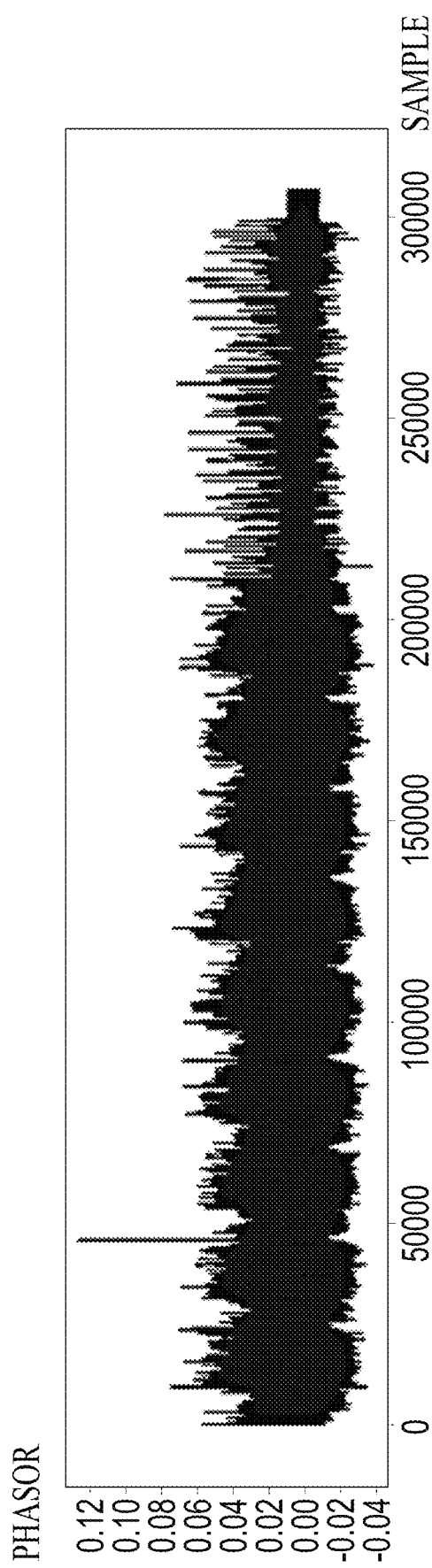
FIG. 5 is a perspective view of a phasor signal.

With reference to FIG. 5, in step S3, the processor 30 utilizes the filter to transform the side channel signal into the phasor signal. FIG. 5 shows a waveform of the phasor signal. The vertical axis represents a phasor of the phasor signal, and the horizontal axis represents samples of a measuring time of measuring the filtered side channel signal. For example, in FIG. 4B, the measuring time of measuring the filtered side channel signal is 80 ms. In FIG. 5, the samples have a count of 320,000 samples. As such, when the processor 30 generates the phasor signal, the processor 30 processes 320,000/80=4,000 counts of samples per millisecond from the filtered side channel signal to create the waveform of the phasor signal shown in FIG. 5.

In the present embodiment, the filter is a Hilbert transform filter. When the processor 30 utilizes the Hilbert transform filter to generate the phasor signal, the processor 30 performs a Hilbert transform to transform the filtered side channel signal into the phasor signal.

Figure 6:
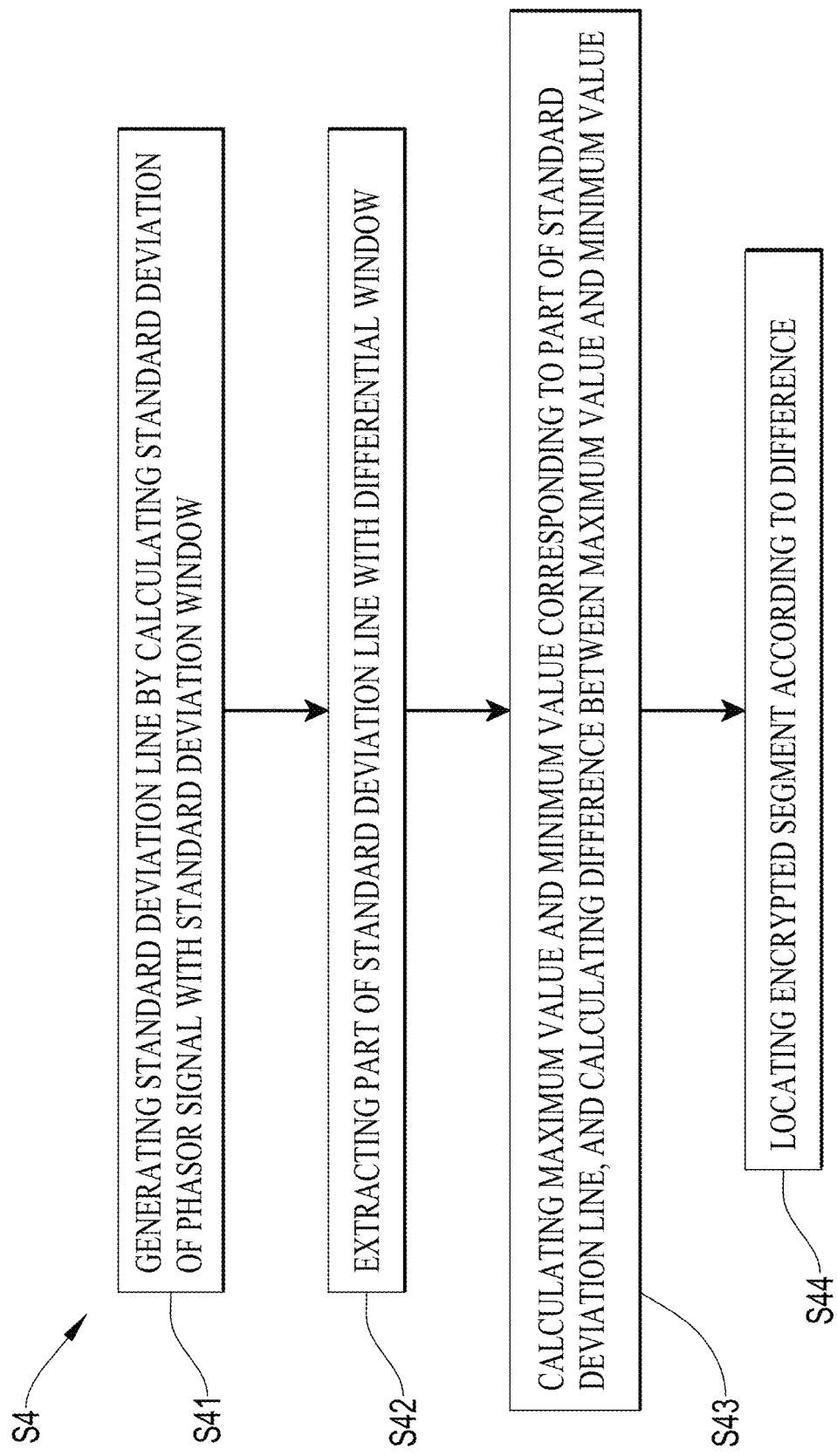
FIG. 6 is another flow chart of the encryption determining method of the present invention.
Figure 7:
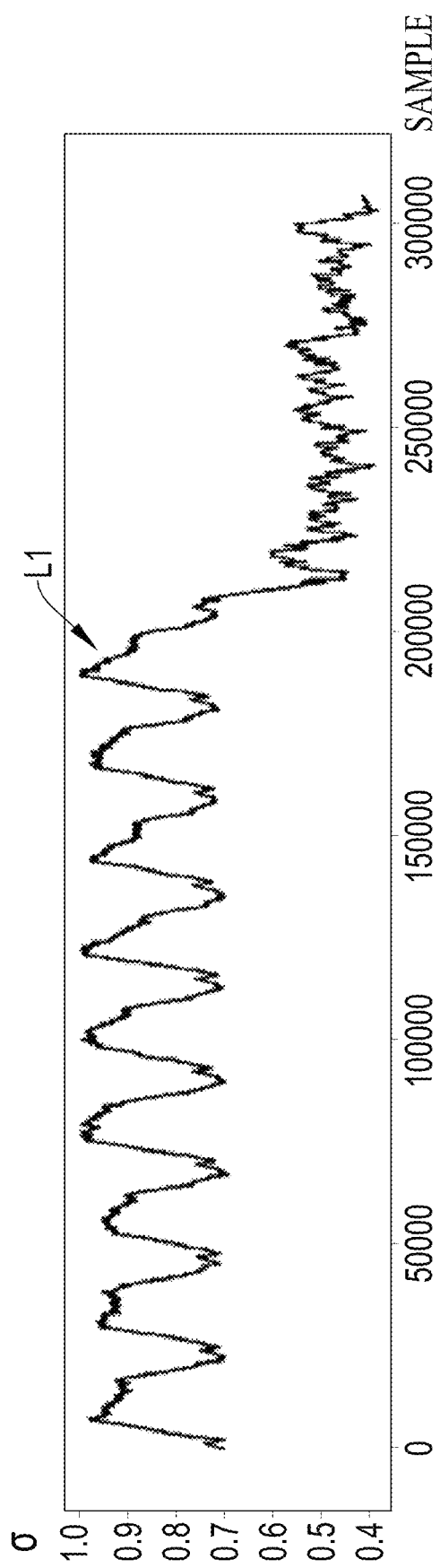
FIG. 7 is a perspective view of a standard deviation line.
Figure 8:
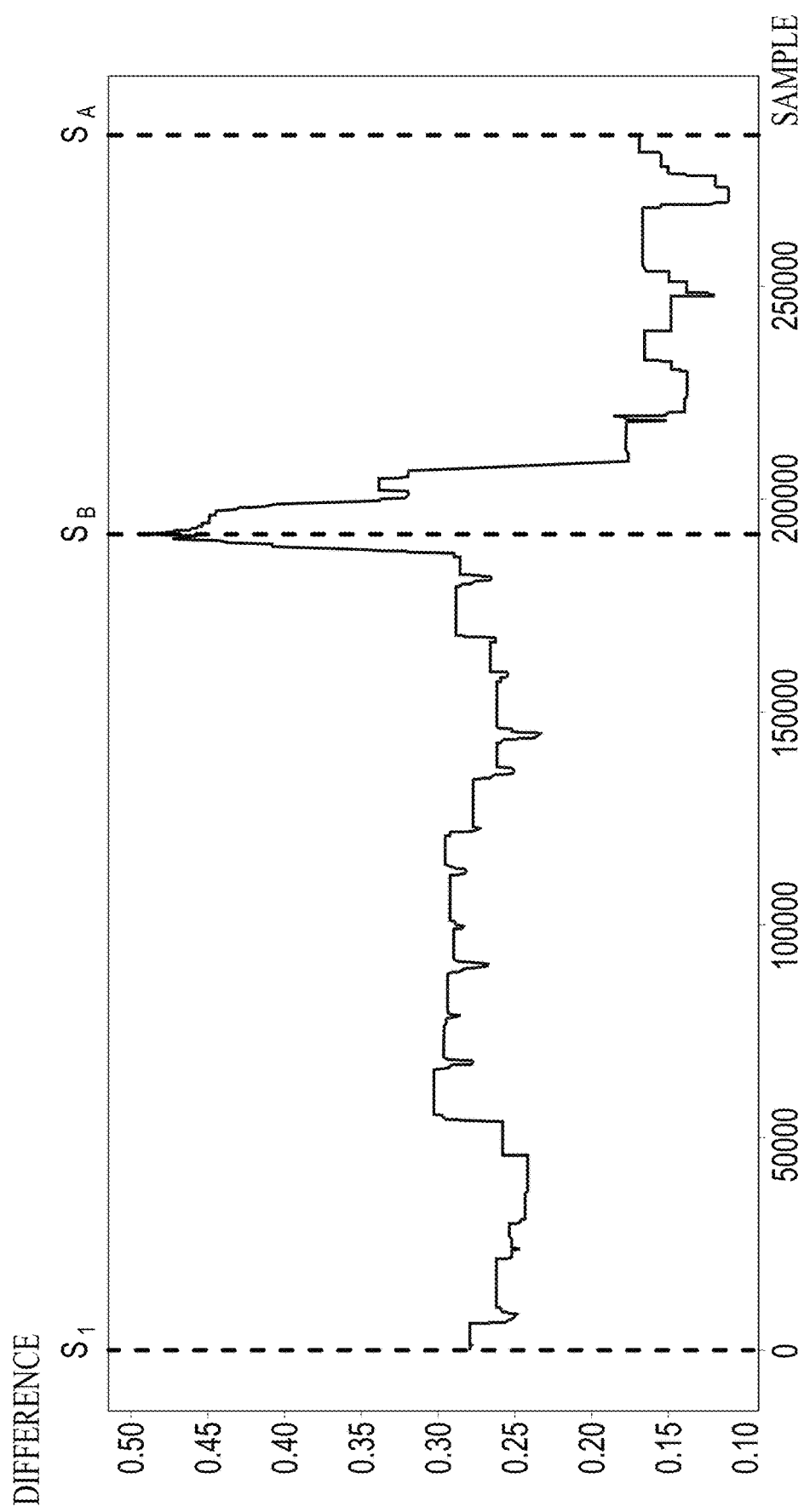
FIG. 8 is a perspective view of a difference in the standard deviation line.

With reference to FIGS. 6 to 8, in step S4, the processor 30 utilizes the standard deviation window to calculate the periodicity of the phasor signal in order to locate the encrypted segment. More particularly, when the processor 30 executes S4, the processor 30 in fact executes the following sub-steps S41 to S44:

Step S41: generating a standard deviation line L1 by calculating the standard deviation ($\sigma$) of the phasor signal with the standard deviation window. The standard deviation window frames a part of the phasor signal for a standard deviation calculation.

Step S42: extracting a part of the standard deviation line L1 with a differential window.

Step S43: calculating a maximum value and a minimum value corresponding to the part of the standard deviation line L1, and calculating a difference between the maximum value and the minimum value.

Step S44: locating the encrypted segment according to the difference.

In step S41, the processor 30 utilizes the standard deviation window to calculate the standard deviation of the phasor signal in order to generate the standard deviation line L1. FIG. 7 provides a perspective view of the standard deviation line L1 after the processor 30 executes step S41. A size of the standard deviation window and a spacing gap at which the standard deviation window moves on the horizontal axis may be configured as desired. Before executing the present invention, a content within the default configuration file may be configured by the user through manipulating the electronic device 200, adjusting settings for the standard deviation window. When the processor 30 executes step S4, the processor 30 adjusts the size of the standard deviation window and spacing gap at which the standard deviation window moves on the horizontal axis according to the default configuration file stored in the memory 20. This adjustment allows the processor 30 to adjust the count of samples framed by the standard deviation window, to adjust the standard deviation of the phasor signal calculated from the count of samples framed by the standard deviation window, and to adjust the generation of the standard deviation line L1.

In steps S42 and S43, the processor 30 utilizes the differential window to extract a part of the standard deviation line L1. The processor 30 then calculates the maximum value and the minimum value corresponding to the part of the standard deviation line L1, and calculates the difference between the maximum value and the minimum value. FIG. 8 shows the difference between the maximum value and the minimum value of the standard deviation line L1 after the processing module 30 executes step S43. A size of the differential window and a spacing gap at which the differential window moves on the horizontal axis may be configured as desired in the default configuration file stored in the memory 20.

Figure 9:
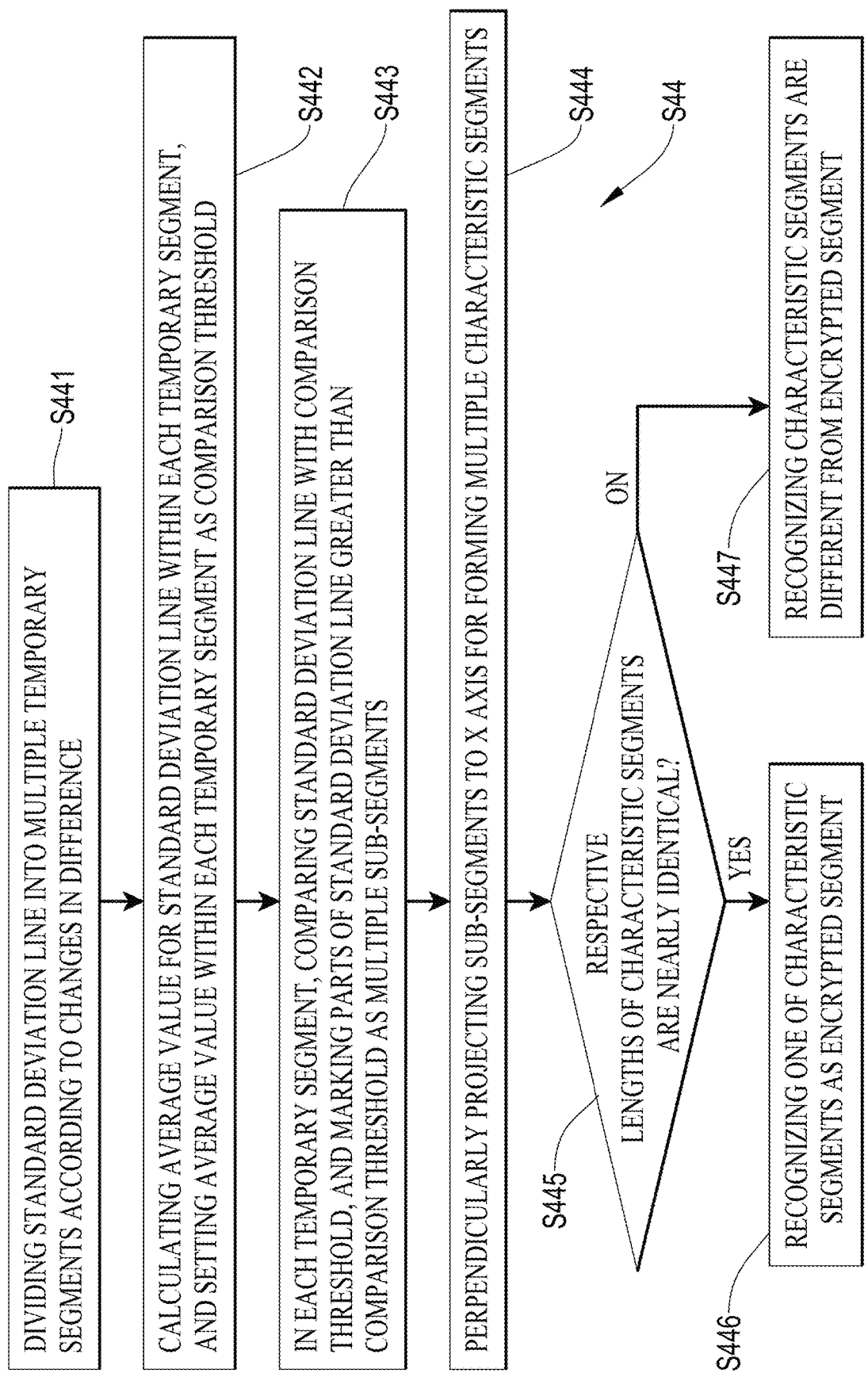
FIG. 9 is another flow chart of the encryption determining method of the present invention.
Figure 10:
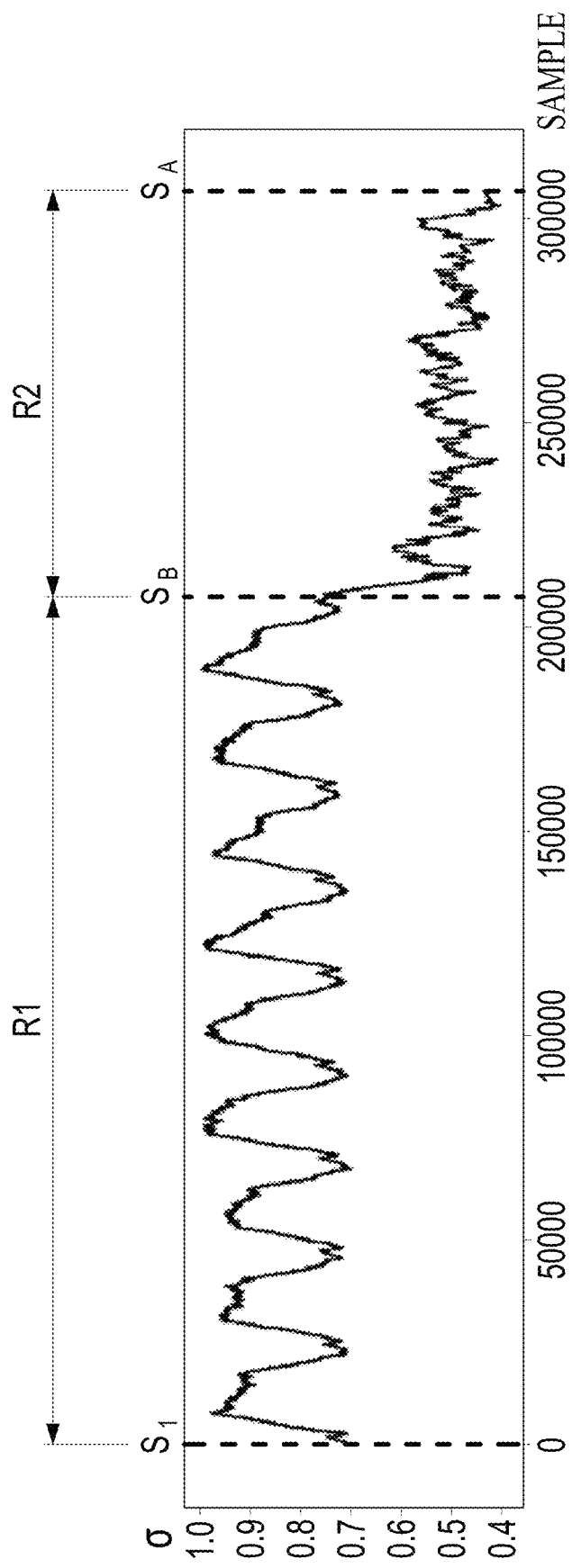
FIG. 10 is a perspective view of dividing temporary segments.

With reference to FIGS. 8 to 10, in step S44, the processor 30 locates the encrypted segment according to the difference. More particularly, when the processor 30 executes step S44, the processor 30 in fact executes the following sub-steps S441 to S447.

Step S441: dividing the standard deviation line L1 into multiple temporary segments according to changes in the difference.

Step S442: calculating an average value for the standard deviation line L1 within each of the temporary segments, and setting the average value within each of the temporary segments as a comparison threshold.

Step S443: in each of the temporary segments, comparing the standard deviation line L1 with the comparison threshold, and marking parts of the standard deviation line L1 greater than the comparison threshold as multiple sub-segments.

Step S444: perpendicularly projecting the sub-segments to an X axis for forming multiple characteristic segments.

Step S445: determining whether respective lengths of the characteristic segments are nearly identical.

Step S446: when determining respective lengths of the characteristic segments are nearly identical, recognizing one of the characteristic segments as the encrypted segment.

Step S447: when determining respective lengths of the characteristic segments are different, recognizing the characteristic segments are different from the encrypted segment.

In step S441, the processor 30 divides the standard deviation line L1 into multiple temporary segments according to changes in the difference. More particularly, the processor 30 determines a separation sample $S_B$ between a first sample $S_1$ and a last sample $S_A$, wherein the separation sample $S_B$ has the greatest difference. With reference to FIG. 10, a position of the separation sample $S_B$ corresponds to a position of a correct sample within the standard deviation line L1 to divide the standard deviation line L1 into the multiple temporary segments. Once the processor 30 determines the separation sample $S_B$, the processor 30 proceeds to divide the standard deviation line L1 according to the separation sample $S_B$. As such, the processor 30 divides the standard deviation line L1 left side of the separation sample $S_B$ as a first temporary segment R1, and the processor 30 divides the standard deviation line L1 right side of the separation sample $S_B$ as a second temporary segment R2.

Figure 11:
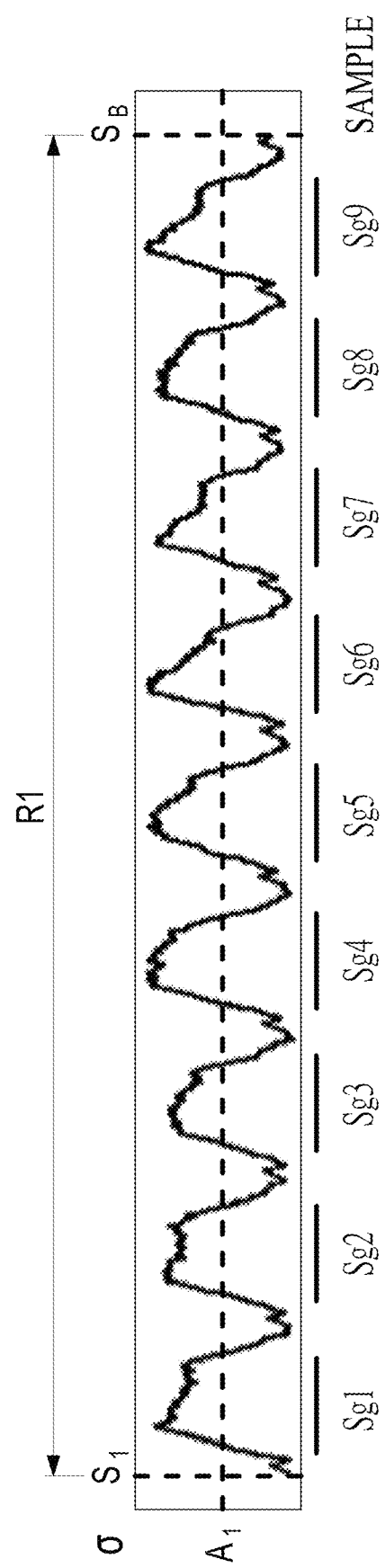
FIG. 11 is a perspective view of projecting and forming characteristic segments from a first temporary segment.
Figure 12:
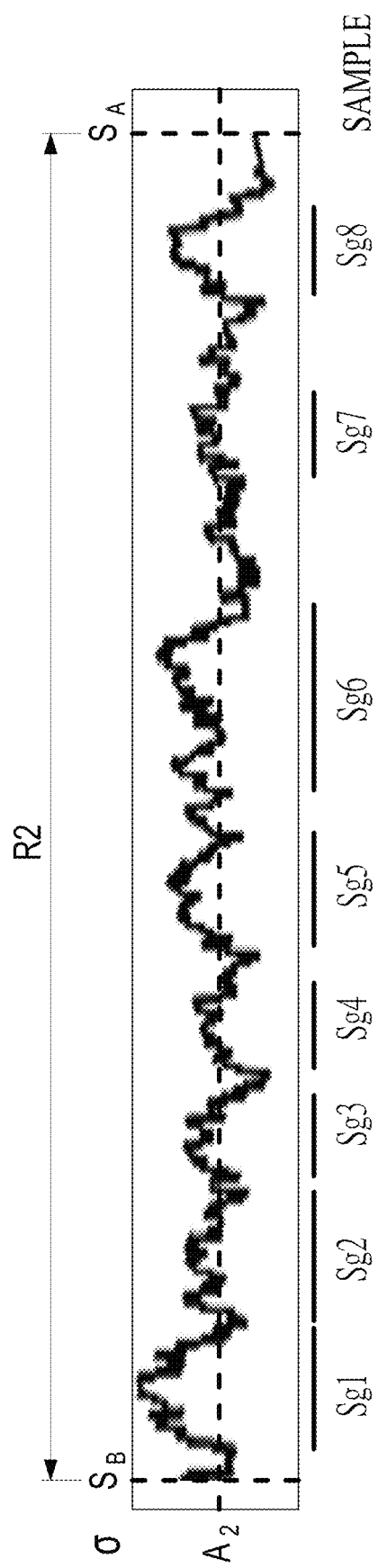
FIG. 12 is a perspective view of projecting and forming characteristic segments from a second temporary segment.

With reference to FIGS. 11 and 12, in step S442, the processor 30 calculates the average value for the standard deviation line L1 within each of the temporary segments, and setting the average value within each of the temporary segments as the comparison threshold. More particularly, the processor 30 respectively calculates a first average value $A_1$ for the standard deviation line L1 within the first temporary segment R1 and calculates a second average value $A_2$ for the standard deviation line L1 within the second temporary segment R2.

In steps S443 and S444, the processor 30 compares the standard deviation line L1 with the comparison threshold in each of the temporary segments, respectively marks parts of the standard deviation line L1 greater than the comparison threshold as the multiple sub-segments, and determines whether the characteristic segments perpendicularly projected from the sub-segments are nearly identical. More particularly, the processor 30 respectively marks parts of the standard deviation line L1 greater than the first average value $A_1$ within the first temporary segment R1 as multiple first sub-segments within the first temporary segment R1, and the processor 30 marks parts of the standard deviation line L1 greater than the second average value $A_2$ within the second temporary segment R2 as multiple second sub-segments within the second temporary segment R2. Furthermore, the processor 30 respectively perpendicularly projects the first sub-segments within the first temporary segment R1 and the second sub-segments within the second temporary segment R2 to the X axis for forming characteristic segments Sg1-Sg9.

More particularly, in the first temporary segment R1 shown in FIG. 11, the first sub-segments perpendicularly project to the X axis and, as a result, form a total of nine characteristic segments Sg1-Sg9. In the second temporary segment R2 shown in FIG. 12, the second sub-segments perpendicularly project to the X axis and, as a result, form a total of eight characteristic segments Sg1-Sg8. The X axis represents a count of samples of the standard deviation line L1 respectively within the first temporary segment R1 and the second temporary segment R2. Therefore, the nine characteristic segments Sg1-Sg9 corresponding to the first temporary segment R1 also correspond to multiple counts of samples for the nine segments. The eight characteristic segments Sg1-Sg8 corresponding to the second temporary segment R2 also correspond to multiple counts of samples for the eight segments.

Figure 13:
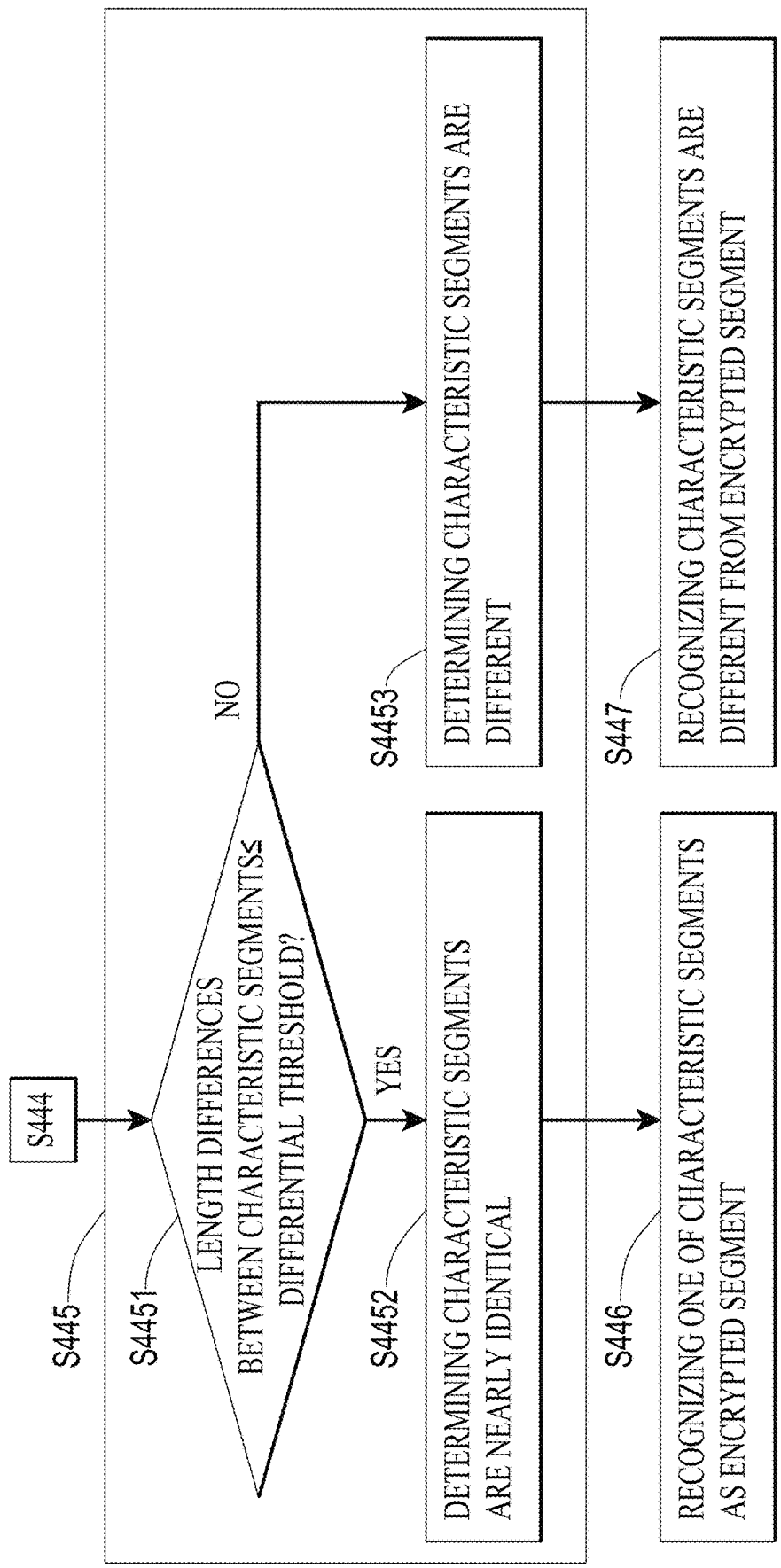
FIG. 13 is another flow chart of the encryption determining method of the present invention.

With reference to FIG. 13, in step S445, the processor 30 determines whether the respective lengths of the characteristic segments are nearly identical. More particularly, when the processor 30 executes step S445, the processor further executes the following sub-steps S4451 to S4453.

Step S4451: determining whether length differences between the characteristic segments are less than or equal to a differential threshold.

Step S4452: when determining the length differences between the characteristic segments are less than or equal to the differential threshold, determining the characteristic segments are nearly identical, and therefore further executing step S446.

Step S4453: when determining the length differences between the characteristic segments are greater than the differential threshold, determining the characteristic segments are different, and therefore further executing step S447.

For the example shown in FIGS. 11 and 12, the length differences between the nine characteristic segments Sg1-Sg9 corresponding to the first temporary segment R1 are barely noticeable, and as such, the length differences between the nine characteristic segments Sg1-Sg9 corresponding to the first temporary segment R1 are considered nearly identical. This also means that the nine characteristic segments Sg1-Sg9 corresponding to the first temporary segment R1 are considered to be periodic, and that one of the nine characteristic segments Sg1-Sg9 corresponding to the first temporary segment R1 is the encrypted segment. On the other hand, the length differences between the eight characteristic segments Sg1-Sg8 corresponding to the second temporary segment R2 are quite noticeable, and as such, the length differences between the eight characteristic segments Sg1-Sg8 corresponding to the second temporary segment R2 are considered different. This also means that the eight characteristic segments Sg1-Sg8 corresponding to the second temporary segment R2 are considered to be aperiodic and devoid of the encrypted segment. The differential threshold may be configured as desired in the default configuration file stored in the memory 20.

Based on contemporary theories about the side channel signal, the side channel signal corresponding to the encrypted segment should retain periodic signal qualities, and since the side channel signal corresponding to the encrypted segment is periodic, the filtered side channel signal, the phasor signal, and the standard deviation line L1 respectively corresponding to the encrypted segment should all be periodic as well. After the processor 30 executes step S445, the processor 30 determines the encrypted segment part of a periodic signal, and determines aperiodic signals are devoid of the encrypted segment. The periodicity is hereby determined as the length of the characteristic segments. As previously disclosed, the characteristic segments with similar lengths are considered periodic, whereas the characteristic segments with noticeably different lengths are considered aperiodic. The length of the characteristic segments, although defined by a length of a count of the samples, also corresponds to a time length of a processing time for measuring the side channel signal. This relationship between a count of the samples and a processing time is previously discussed, as previously mentioned, the processor 30 processes several thousand counts of samples per millisecond. More particularly, the time length of the processing time of the side channel signal is proportional to the count of the samples as the following formula suggests:

count of samples=(time length of processing time)* (sampling frequency)

wherein the sampling frequency is a sampling frequency of the processor 30 filtering the side channel signal into the filtered side channel signal. For example, the sampling frequency is for every millisecond the processor 30 takes 4,000 samples of the side channel signal to generate the filtered side channel signal.

Figure 14:
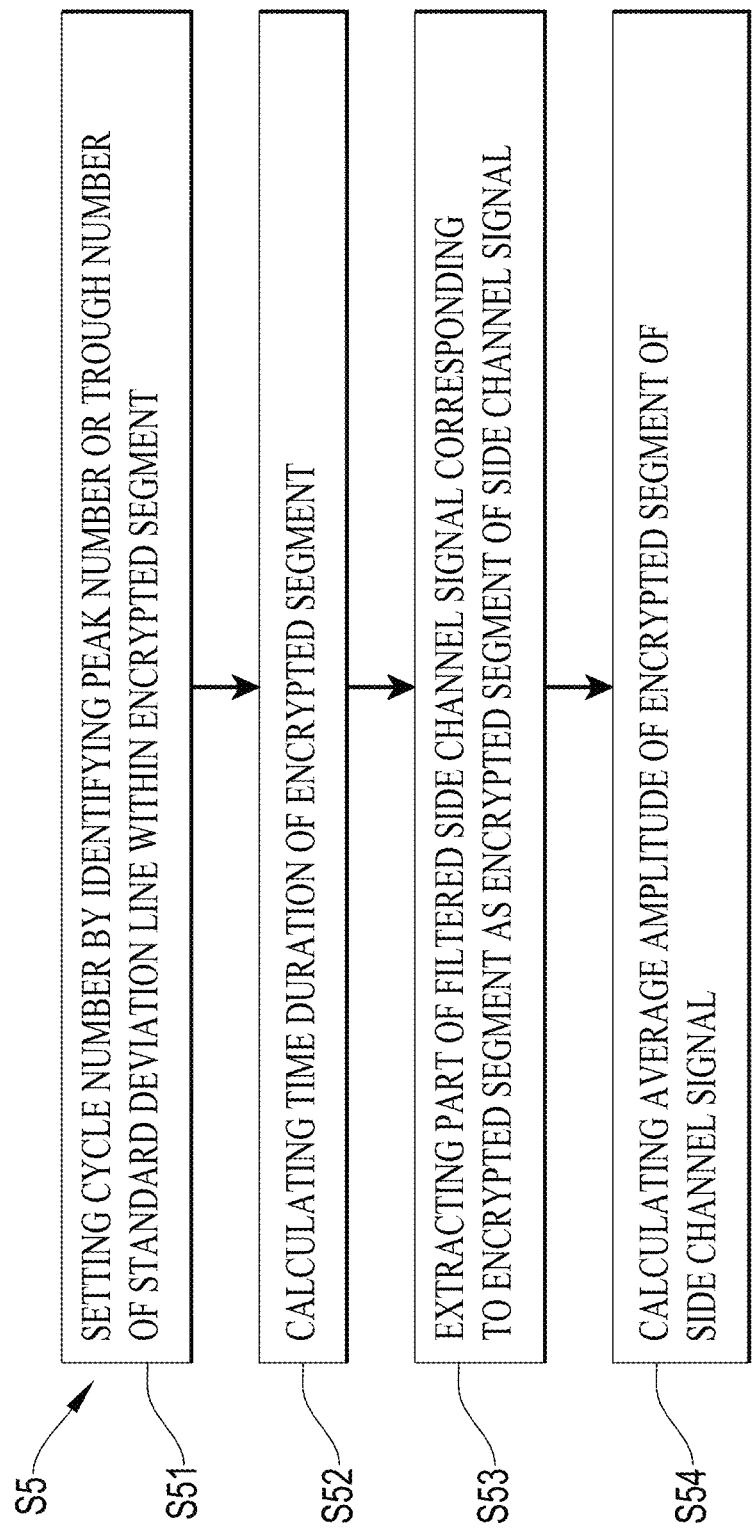
FIG. 14 is another flow chart of the encryption determining method of the present invention.
Figure 15:
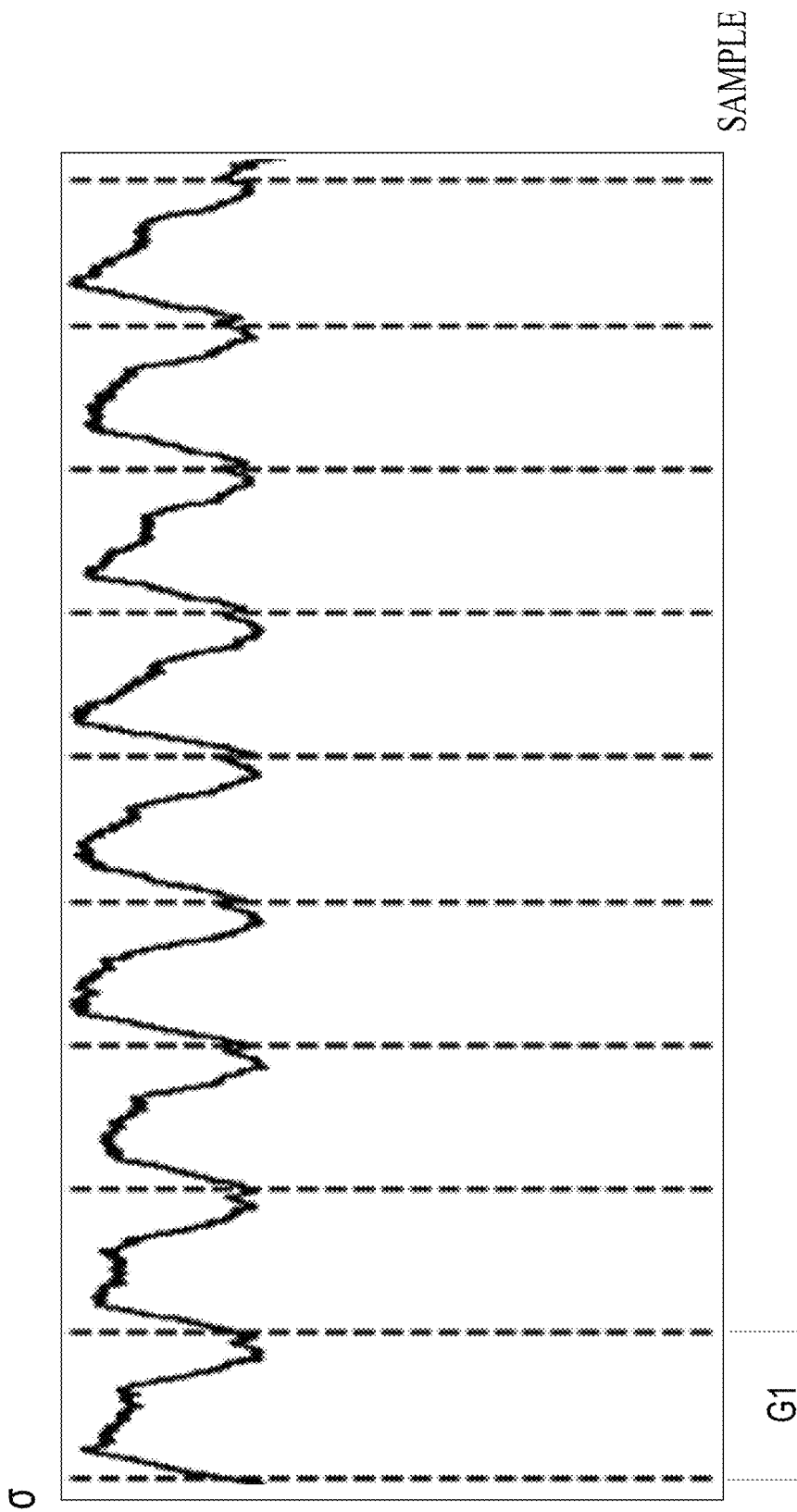
FIG. 15 is a perspective view of detecting a cycle number from an encrypted segment.
Figure 16:
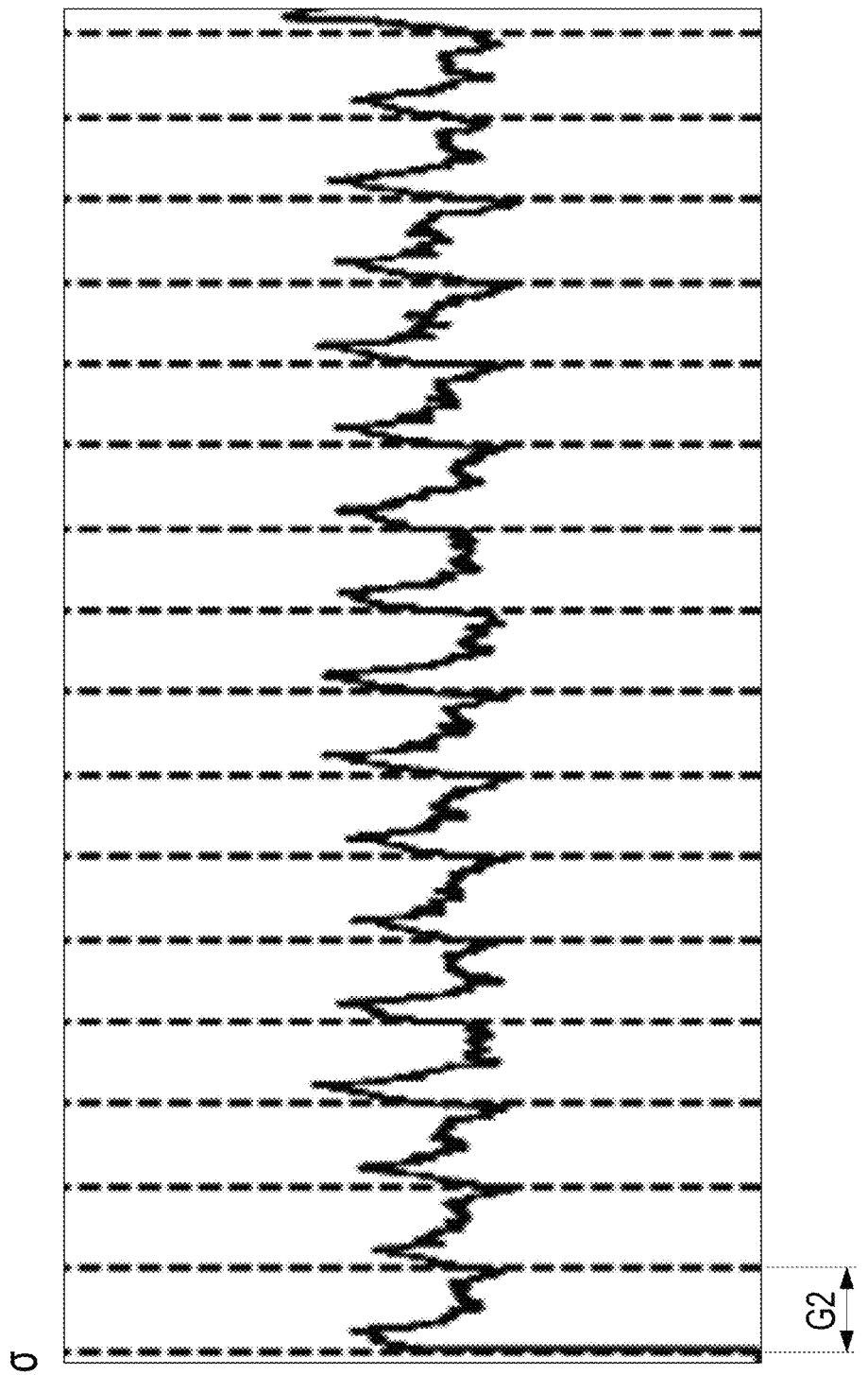
FIG. 16 is a perspective view of detecting a cycle number from another encrypted segment.

With reference to FIGS. 14 to 16, in step S5, the processor 30 extracts the at least one encrypted characteristic from the encrypted segment. More particularly, when the processor 30 executes step S5, the processor 30 executes the following sub-steps S51 to S54.

Step S51: setting a cycle number by identifying a peak number or a trough number of the standard deviation line L1 within the encrypted segment.

Step S52: calculating a time duration of the encrypted segment.

Step S53: extracting a part of the filtered side channel signal corresponding to the encrypted segment as an encrypted segment of the side channel signal.

Step S54: calculating an average amplitude of the encrypted segment of the side channel signal.

As such, the at least one encrypted characteristic extracted from the encrypted segment includes the cycle number, the time duration, and the average amplitude.

In step S6, the processor 30 utilizes the characteristic recognition model to recognize the at least one encrypted characteristic in order to generate the encryption analytic result. More particularly, when the processor 30 executes step S6, the processor 30 utilizes the characteristic recognition model to recognize the cycle number, the time duration, or the average amplitude for generating the encryption analytic result. This is because, for instance, for contemporary symmetric-key algorithms, such as famous algorithms like Data Encryption Standard (DES) and Advanced Encryption Standard (AES), these algorithms respectively correspond to different counts of duty cycles, different processing time, and different consumption of energy or power when encrypting data. In other words, different counts of duty cycles of different algorithms correspond to the cycle number identified within the encrypted segment of the present invention. Different processing time corresponds to the count of samples within the encrypted segment of the present invention and also corresponds to a time length of part of the filtered side channel signal corresponding to the encrypted segment. Different consumption of energy or power corresponds to amplitude changes of part of the filtered side channel signal corresponding to the encrypted segment.

With reference to FIG. 15, in this example, the processor 30 calculates that a first cycle G1 has repeated nine times as the processor 30 detects roughly how many times waveforms within the encrypted segment have repeated. The processor 30 therefore obtains the cycle number as nine.

With reference to FIG. 16, in this example, the processor 30 also roughly detects a second cycle G2 and calculates that the second cycle G2 has repeated sixteen times. According to the characteristic recognition model, the processor 30 determines the cycle number as nine corresponding to AES, and the processor 30 determines the cycle number as sixteen corresponding to DES. Therefore, the processor determines the encrypted segment shown in FIG. 15 utilizes AES, and the encrypted segment shown in FIG. 16 utilizes DES.

Figure 17:
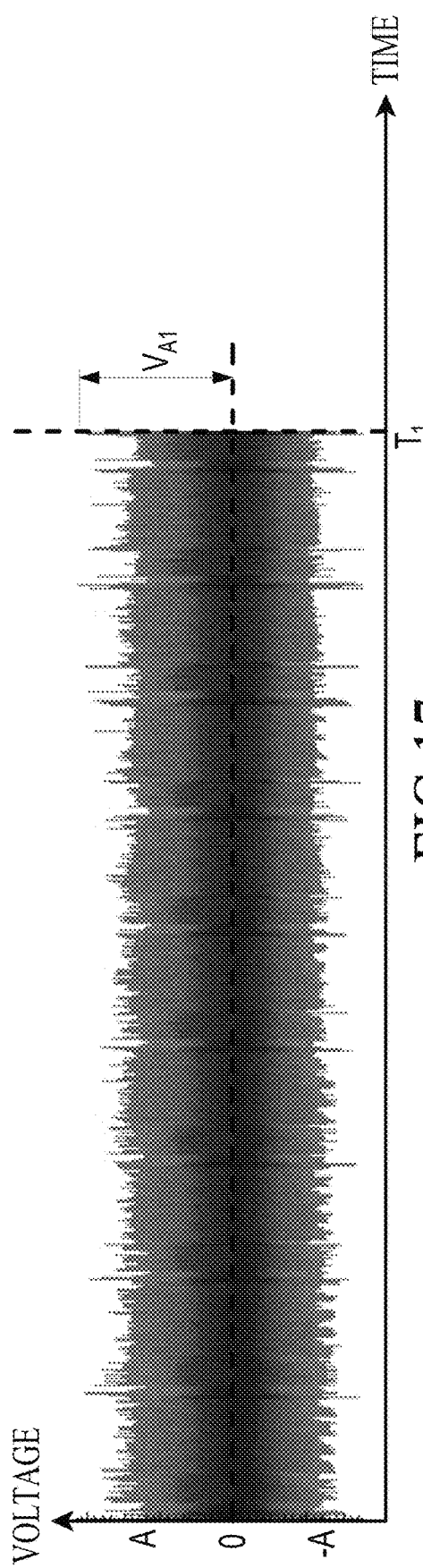
FIG. 17 is a perspective view of the filtered side channel signal corresponding to the encrypted segment.
Figure 18:
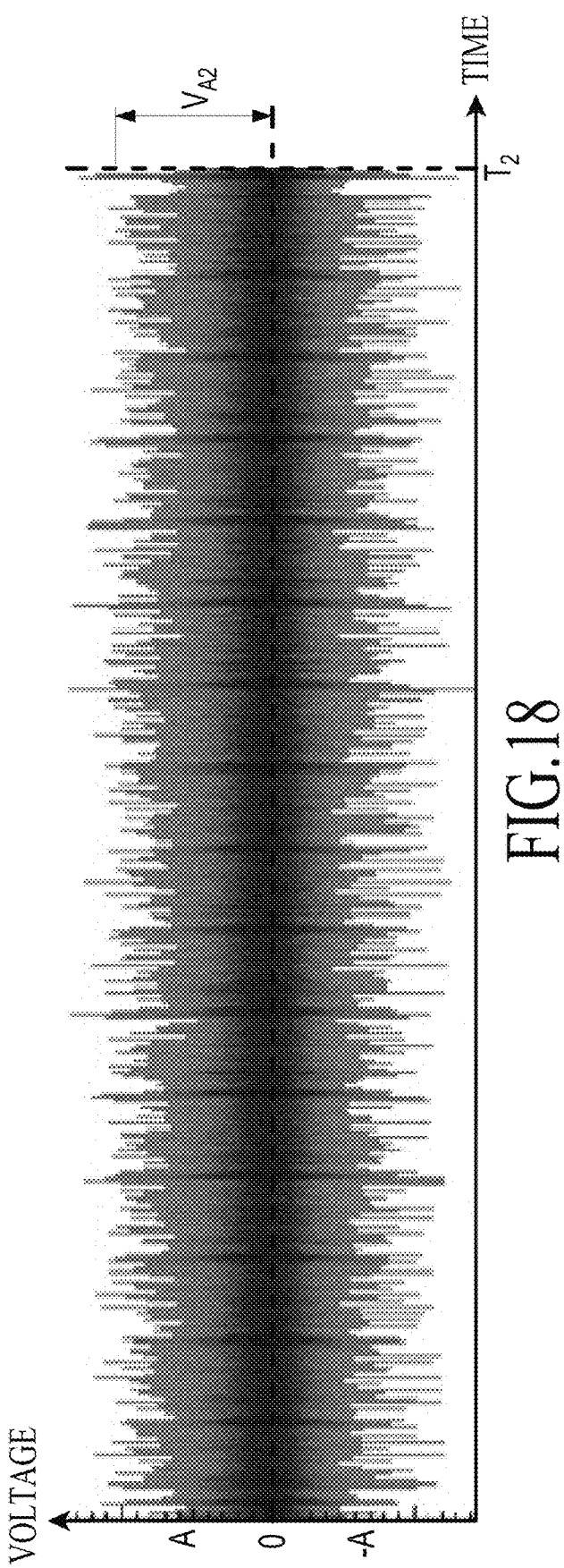
FIG. 18 is a perspective view of the filtered side channel signal corresponding to another encrypted segment.

With reference to FIGS. 17 and 18, after locating the encrypted segment, the processor 30 of the present invention may also utilize the characteristic recognition model to recognize the time duration or the average amplitude for generating the encryption analytic result. More particularly, the processor 30 can obtain the phasor signal from a part of the standard deviation line L1 corresponding to the encrypted segment, and then further obtain a part of the filtered side channel signal corresponding to the encrypted segment from the obtained phasor signal.

With reference to FIG. 17, in this example, the part of the filtered side channel signal corresponding to the located encrypted segment includes two characteristics—a first time length characteristic $T_1$ and a first voltage amplitude characteristic $V_{A1}$. According to the characteristic recognition model, the processor 30 determines that the encrypted segment corresponding to the first time length characteristic $T_1$ utilizes AES. Furthermore, in this example, the first voltage amplitude characteristic $V_{A1}$ is a fluctuating voltage amplitude of the filtered side channel signal. The processor 30 calculates an averaged absolute value of a voltage of the filtered side channel signal as the first voltage amplitude characteristic $V_{A1}$ in this example, and the processor 30 also recognizes the first voltage amplitude characteristic $V_{A1}$ as an averaged amplitude value. According to the characteristic recognition model, the processor 30 determines that the encrypted segment corresponding to the first voltage amplitude characteristic $V_{A1}$ utilizes AES.

In another embodiment, the part of the filtered side channel signal corresponding to the located encrypted segment further includes a first power characteristic. The processor 30 calculates an average of a square of the voltage of the filtered side channel signal shown in FIG. 17 as the first power characteristic, and the processor 30 also recognizes the first power characteristic as the averaged amplitude value. Furthermore, according to the characteristic recognition model, the processor 30 determines that the encrypted segment corresponding to the first power characteristic utilizes AES. In other words, in this embodiment, the averaged amplitude value corresponds to the power consumption of utilizing AES. The power consumption is proportional to the square of the voltage, and therefore, in the example shown in FIG. 17, the at least one encrypted characteristic gathered from the filtered side channel signal can be utilized to linearly determine what type of encryption algorithm is utilized.

With reference to FIG. 18, in this example, the part of the filtered side channel signal corresponding to the located encrypted segment includes two characteristics—a second time length characteristic $T_2$ and a second voltage amplitude characteristic $V_{A2}$. According to the characteristic recognition model, the processor 30 determines that the encrypted segment corresponding to having the second time length characteristic $T_2$ utilizes DES. Furthermore, in this example, the second voltage amplitude characteristic $V_{A2}$ is the fluctuating voltage amplitude of the filtered side channel signal.

The processor 30 calculates an averaged absolute value of a voltage of the filtered side channel signal as the second voltage amplitude characteristic $V_{A2}$ in this example, and the processor 30 also recognizes the second voltage amplitude characteristic $V_{A2}$ as the averaged amplitude value. According to the characteristic recognition model, the processor 30 determines that the encrypted segment corresponding to the second voltage amplitude characteristic $V_{A2}$ utilizes DES.

In another embodiment, the part of the filtered side channel signal corresponding to the located encrypted segment further includes a second power characteristic. The processor 30 calculates an average of a square of the voltage of the filtered side channel signal shown in FIG. 18 as the second power characteristic, and the processor 30 also recognizes the second power characteristic as the averaged amplitude value. Furthermore, according to the characteristic recognition model, the processor 30 determines that the encrypted segment corresponding to the second power characteristic utilizes DES. In other words, in this embodiment, the averaged amplitude value corresponds to the power consumption of utilizing DES. As the power consumption is proportional to the square of the voltage, in the example shown in FIG. 18, the at least one encrypted characteristic gathered from the filtered side channel signal can be utilized to linearly determine what type of encryption algorithm is utilized.

Since the power consumption of DES is greater than the power consumption of AES, since the voltage amplitude corresponding to DES is greater than the voltage amplitude corresponding to AES, and since the processing time of DES is greater than the processing time of AES when encrypting data, the processor 30 of the present invention may utilize all of the above determinations in accordance to the characteristic recognition model to conclude that the filtered side channel signal shown in FIG. 17 utilizes AES, and the filtered side channel signal shown in FIG. 18 utilizes DES. The encryption algorithm utilized for the filtered side channel signal is in fact also the encryption algorithm utilized for the side channel signal before the side channel signal is filtered by the processor 30.

The processor 30 of the present invention may further execute the following step:

utilizing the at least one encrypted characteristic and the encryption analytic result corresponding to the at least one characteristic as a training data, and generating the characteristic recognition model according to the training data.

More particularly, the present invention utilizes the at least one encrypted characteristic and the encryption analytic result corresponding to the at least one characteristic to train the characteristic recognition model according to weight data stored in the memory 20 through machine learning. This allows the trained characteristic recognition model to more accurately generate the encryption analytic result, and as a result, the position of the encrypted segment is more efficiently located, and the encryption type corresponding to the side channel signal is more efficiently analyzed.

With comparison to prior arts, the present invention avoids needing to collect multiple side channel signals and spend great processing cost, waste great amount of energy, waste great amount of processing time to synchronize time stamps of all the collected side channel signals, and then to analyze for analytic results from the synchronized multiple side channel signals. The present invention only needs to receive the side channel signal as a single signal in order to generate the encryption analytic result from the single side channel signal. As a result, the present invention is able to automatically locate the position of the encrypted segment and analyze the encryption type according to the characteristic recognition model. The characteristic recognition model is well trained in the encryption determining device of the present invention. As such, the present invention is able to more efficiently detect the encryption type corresponding to the side channel signal. The present invention decreases time needed and human resources needed to analyze the encryption type corresponding to the side channel signal.

What is claimed is:

1. An encryption determining device, comprising:
   a side channel sensor, detecting a side channel signal;
   a memory, being configured to store a characteristic recognition model;
   a processor, electrically connecting the side channel sensor and the memory, and being configured to:
   receive the side channel signal from the side channel sensor;
   generate a filtered side channel signal by filtering noise within the side channel signal;
   generate a phasor signal by utilizing a filter to covert the filtered side channel signal;
   locate an encrypted segment by calculating a periodicity of the phasor signal utilizing a standard deviation window;
   extract at least one encrypted characteristic from the encrypted segment; and
   generate an encryption analytic result by recognizing the at least one encrypted characteristic according to the characteristic recognition model; wherein the encryption analytic result includes a position of the encrypted segment within the side channel signal, and an encryption type corresponding to the side channel signal.

2. The encryption determining device as claimed in claim 1, wherein the processor is further configured to generate the characteristic recognition model by utilizing the at least one encrypted characteristic and the encryption analytic result corresponding to the at least one encrypted characteristic as a training data.

3. The encryption determining device as claimed in claim 1, wherein when the processor locates the encrypted segment by calculating the periodicity of the phasor signal utilizing the standard deviation window, the processor is further configured to:
   generate a standard deviation line by calculating a standard deviation of the phasor signal utilizing the standard deviation window; wherein the standard deviation window frames a part of the phasor signal for calculating standard deviation;
   extract a part of the standard deviation line by utilizing a differential window;
   calculate a maximum value and a minimum value corresponding to the part of the standard deviation line, and calculate a difference between the maximum value and the minimum value; and
   locate the encrypted segment according to the difference.

4. The encryption determining device as claimed in claim 3, wherein when the processor locates the encrypted segment according to the difference, the processor is further configured to:
   divide the standard deviation line into multiple temporary segments according to changes in the difference;
   compare the standard deviation line with a comparison threshold in each of the temporary segments, and make parts of the standard deviation line greater than the comparison threshold as multiple sub-segments in each of the temporary segments;

perpendicularly project the sub-segments to an X axis for forming multiple characteristic segments;

determine whether respective lengths of the characteristic segments are nearly identical; and recognize one of the characteristic segments as the encrypted segment when determining the respective lengths of the characteristic segments are nearly identical.

5. The encryption determining device as claimed in claim 4, wherein:

the processor calculates an average value for the standard deviation line within each of the temporary segments, and sets each of the average values as the comparison threshold within each of the temporary segments.

6. The encryption determining device as claimed in claim 4, wherein when the processor determines whether the characteristic segments are nearly identical, the processor is further configured to determine whether length differences between the characteristic segments are less than or equal to a differential threshold, and determine the characteristic segments are nearly identical when determining the length differences between the characteristic segments are less than or equal to the differential threshold.

7. The encryption determining device as claimed in claim 3, wherein when the processor extracts the at least one encrypted characteristic from the encrypted segment, the processor is further configured to set a cycle number by identifying a peak number or a trough number of the standard deviation line within the encrypted segment;

wherein the at least one encrypted characteristic includes the cycle number.

8. The encryption determining device as claimed in claim 1, wherein when the processor extracts the at least one encrypted characteristic from the encrypted segment, the processor is further configured to calculate a time duration of the encrypted segment;

wherein the at least one encrypted characteristic includes the time duration.

9. The encryption determining device as claimed in claim 1, wherein when the processor extracts the at least one encrypted characteristic from the encrypted segment, the processor is further configured to:

extract a part of the filtered side channel signal corresponding to the encrypted segment as an encrypted segment of the side channel signal; and calculate an average amplitude of the encrypted segment of the side channel signal;

wherein the at least one encrypted characteristic includes the average amplitude.

10. An encryption determining method, executed by a processor, and comprising the following steps:

receiving a side channel signal;

generating a filtered side channel signal by filtering noise within the side channel signal;

generating a phasor signal by utilizing a filter to covert the filtered side channel signal;

locating an encrypted segment by calculating a periodicity of the phasor signal utilizing a standard deviation window;

extracting at least one encrypted characteristic from the encrypted segment; and generating an encryption analytic result by recognizing the at least one encrypted characteristic according to a characteristic recognition model; wherein the encryption analytic result includes a position of the encrypted segment within the side channel signal, and an encryption type corresponding to the side channel signal.

11. The encryption determining method as claimed in claim 10, further comprising the following step:

generating the characteristic recognition model by utilizing the at least one encrypted characteristic and the encryption analytic result corresponding to the at least one encrypted characteristic as a training data.

12. The encryption determining method as claimed in claim 10, wherein the step of locating the encrypted segment by calculating the periodicity of the phasor signal utilizing the standard deviation window, further includes the following sub-steps:

generating a standard deviation line by calculating a standard deviation of the phasor signal utilizing the standard deviation window; wherein the standard deviation window frames a part of the phasor signal for calculating standard deviation;

extracting a part of the standard deviation line by utilizing a differential window;

calculating a maximum value and a minimum value corresponding to the part of the standard deviation line, and calculating a difference between the maximum value and the minimum value; and locating the encrypted segment according to the difference.

13. The encryption determining method as claimed in claim 12, wherein the step of locating the encrypted segment according to the difference, further includes the following sub-steps:

dividing the standard deviation line into multiple temporary segments according to changes in the difference;

in each of the temporary segments, comparing the standard deviation line with a comparison threshold, and marking parts of the standard deviation line greater than the comparison threshold as multiple sub-segments;

perpendicularly projecting the sub-segments to an X axis for forming multiple characteristic segments;

determining whether the characteristic segments are nearly identical;

when determining the characteristic segments are nearly identical, recognizing one of the characteristic segments as the encrypted segment.

14. The encryption determining method as claimed in claim 13, wherein:

the comparison threshold within each of the temporary segments is an average value for the standard deviation line within each of the temporary segments.

15. The encryption determining method as claimed in claim 13, wherein the step of determining whether the characteristic segments are nearly identical, includes the following sub-steps:

determining whether length differences between the characteristic segments are less than or equal to a differential threshold;

when determining the length differences between the characteristic segments are less than or equal to the differential threshold, determining the characteristic segments are nearly identical.

16. The encryption determining method as claimed in claim 12, wherein the step of extracting the at least one encrypted characteristic from the encrypted segment, further includes the following sub-step:

setting a cycle number by identifying a peak number or a trough number of the standard deviation line within the encrypted segment;

wherein the at least one encrypted characteristic includes the cycle number.

17. The encryption determining method as claimed in claim 10, wherein the step of extracting the at least one encrypted characteristic from the encrypted segment, further includes the following sub-step:
   calculating a time duration of the encrypted segment;
   wherein the at least one encrypted characteristic includes the time duration.

18. The encryption determining method as claimed in claim 10, wherein the step of extracting the at least one encrypted characteristic from the encrypted segment, further includes the following sub-steps:
   extracting a part of the filtered side channel signal corresponding to the encrypted segment as an encrypted segment of the side channel signal;
   calculating an average amplitude of the encrypted segment of the side channel signal;
   wherein the at least one encrypted characteristic includes the average amplitude.

* * * * *